United States Patent

Topf

[11] Patent Number: 5,139,402
[45] Date of Patent: Aug. 18, 1992

[54] FLOATING PLASTICS SECTION CALIBRATING DEVICE

[75] Inventor: Siegfried Topf, Waldmüllerweg, Fed. Rep. of Germany

[73] Assignee: Friedrich Theysohn GmbH, Bad Oeynhausen, Fed. Rep. of Germany

[21] Appl. No.: 621,604

[22] Filed: Dec. 4, 1990

[51] Int. Cl.⁵ .............................................. B29C 47/90
[52] U.S. Cl. ........................... 425/71; 264/178 R; 425/182; 425/326.1; 425/388
[58] Field of Search ............... 264/40.7, 209.4, 178 R; 425/140, 451.4, 451.6, 451.5, DIG. 121, 378.1, 67, 68, 70, 71, 326.1, 388, 182, 343, 404, 446

[56] References Cited

U.S. PATENT DOCUMENTS

| | | | |
|---|---|---|---|
| 2,847,036 | 8/1958 | Dow | 425/71 |
| 3,378,888 | 4/1968 | Reib et al. | 425/388 |
| 3,504,395 | 4/1970 | MacPherson | 425/71 |
| 3,538,210 | 11/1970 | Gatto | 425/71 |
| 3,635,615 | 1/1972 | Hartmann et al. | 425/71 |
| 3,717,426 | 2/1973 | Tucking et al. | 425/71 |
| 3,813,200 | 5/1974 | Gergely | 425/140 |
| 3,851,028 | 11/1974 | Beyer | 425/71 |
| 3,883,286 | 5/1975 | Kinslow et al. | 425/451.4 |
| 4,029,452 | 6/1977 | Schippers et al. | 425/71 |
| 4,035,125 | 7/1977 | Gergely | 264/40.7 |
| 4,059,383 | 11/1977 | Tsutsumi | 425/451.6 |
| 4,090,828 | 5/1978 | Renegar | 425/71 |
| 4,172,577 | 10/1979 | Holdt | 425/DIG. 121 |
| 4,181,487 | 1/1980 | Kessler | 425/388 |
| 4,273,524 | 6/1981 | Smith | 425/451.5 |
| 4,276,013 | 6/1981 | Bazzea | 425/451.5 |
| 4,329,314 | 5/1982 | Jackson et al. | 425/378.1 |
| 4,361,530 | 11/1982 | Peer | 264/40.7 |
| 4,508,500 | 4/1985 | French | 425/388 |
| 4,563,143 | 1/1986 | Pettersson | 425/451.5 |
| 4,857,247 | 8/1989 | Rackowski | 264/40.7 |

FOREIGN PATENT DOCUMENTS

0207064 6/1986 European Pat. Off.

Primary Examiner—Jay H. Woo
Assistant Examiner—Robert B. Davis
Attorney, Agent, or Firm—Marmorek, Guttman & Rubenstein

[57] ABSTRACT

The invention relates to a calibrating device for extruded plastics sections, having a number of calibrating units 5 to 7 disposed successively in the drawing-off direction. The calibrating units 5 to 7 are mounted on a guide 1, 2 floatably in the plane normal of the drawing-off direction and disposed on the guide 1, 2, securably in the drawing-off direction. A calibrating device of the kind specified ensures that the precise positioning of the successively disposed calibrating units 5 to 7 is superfluous. Since therefore the section passes the individual calibrating units without lateral deflection or jamming, the individual calibrating unit can be designed with close dimensional tolerances, utilizing the loadability of the section, without introducing an excessive shrinkage into the section.

5 Claims, 1 Drawing Sheet

(A-A)

(B-B)

FLOATING PLASTICS SECTION CALIBRATING DEVICE

The invention relates to a calibrating device for extruded plastics sections, comprising a number of calibrating units disposed, more particularly in a continuous cooling chamber under negative pressure and/or water, successively in the drawing-off direction of the section.

In the calibrating devices of the kind specified used in practice the individual calibrating units are aligned axially in relation to one another and mounted fixed on an understructure. It has been found that even when the greatest possible care is taken with the assembly of the individual calibrating units on the substructure it is impossible to achieve a 100% precise alignment of the up to 15 calibrating units. This means that the section to be guided through the calibrating units, which is in itself very rigid, is subjected to appreciable mechanical stressings. To prevent such stressings and the resulting increased shrinkage and/or surface faults, the dimensional tolerances of the plastics-contacting calibrating members and therefore of the plastics sections themselves have been increased. However, this step is not in harmony with the requirement to obtain sections having the maximum dimensional precision.

It is an object of the invention to provide a calibrating device by means of which sections of maximum dimensional accuracy can be obtained with low shrinkage.

This problem is solved by a calibrating device of the kind specified according to the invention in which the calibrating units are mounted on a guide floatably in the plane normal of the drawing-off direction.

In the calibrating device according to the invention the section to be drawn off is not additionally stressed at the individual calibrating units on account of the alignment thereof not being 100% correct, because the calibrating units can be adjusted individually to the position of the section to be drawn off. This means that the acceptable stressing of the section at the individual calibrating units can be exhaustively used by the individual calibrating units to support the geometry of the section, since use can be made of calibrating units with close tolerances. The result is sections of increased dimensional accuracy. Moreover, due to the improved contact between each of the calibrating units and the section, the close tolerances of the individual calibrating units lead to an improved cooling effect. The improved cooling can be used to shorten the cooling path and/or to increase drawing-off speeds. As a whole, the use of the calibrating device according to the invention leads to sections of more accurate dimensions with smaller installations and/or with higher productivity, without increasing the shrinkage of the section.

According to one feature of the invention the calibrating units can be adjustable on the guide in the drawing-off direction. This advantageously enables fluctuations in the external dimensions of the sections due to the material to be corrected by changing the distance between the individual calibrating units.

The guide can consist of rails on which the calibrating units are disposed after the fashion of carriages with lateral and vertical clearance and bear the adjustable stops, for the calibrating units.

BRIEF DESCRIPTION OF THE DRAWINGS

An embodiment of the invention will now be explained in greater detail with reference to the drawings, wherein.

Figure 2:
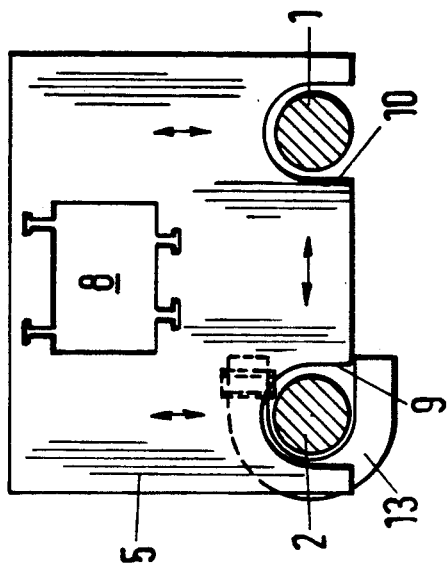
FIG. 2 shows the guide with the calibrating units in FIG. 1, sectioned along the line A—A in FIG. 1.
Figure 3:
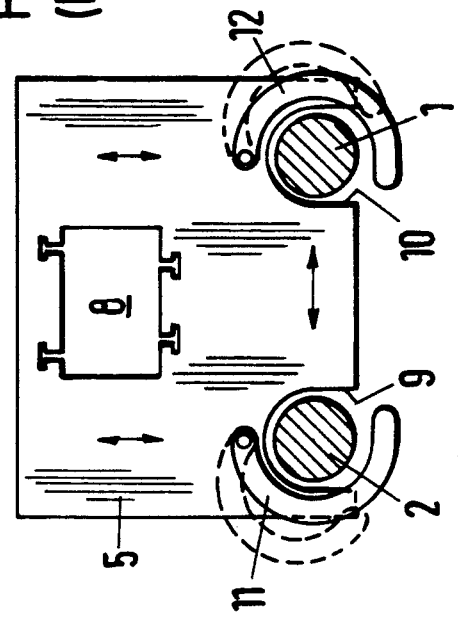
FIG. 3 shows the guide with the calibrated units as in FIG. 1, sectioned along the line B—B in FIG. 1.
Figure 1:
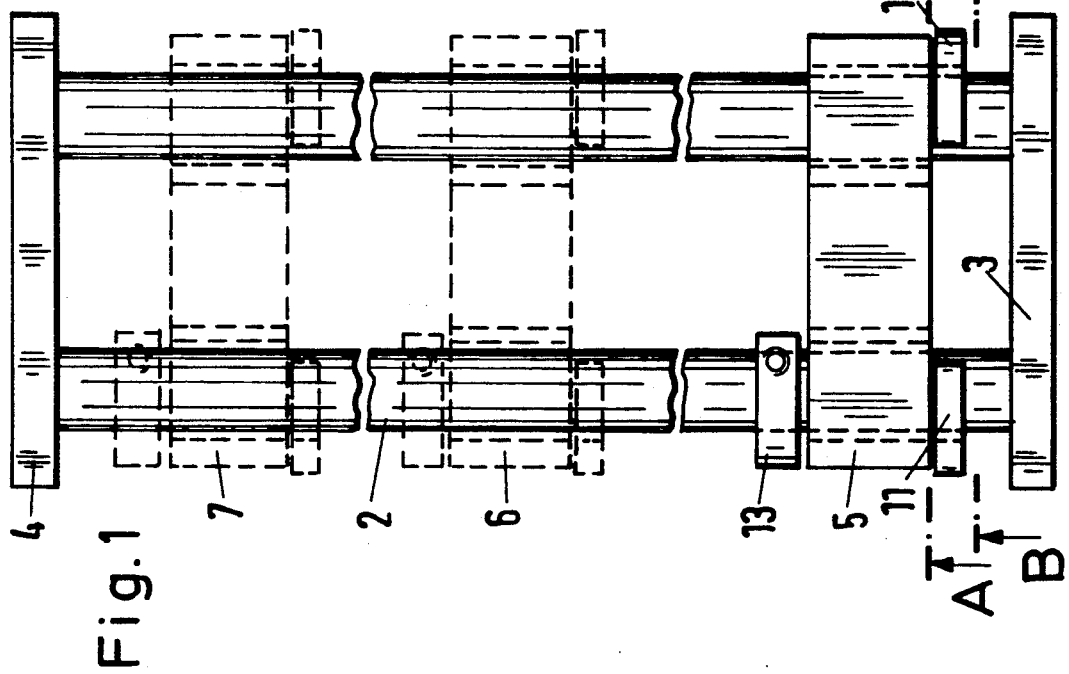
FIG. 1 is a plan view of a guide having one calibrating unit drawn in solid lines and two calibrating units drawn in broken lines.

Referring to the drawings, a calibrating device is disposed in a continuous cooling chamber (not shown) which is under negative pressure and/or water. In such a cooling chamber cooling fluid is sprayed on to the extruded section on all sides, so that it becomes very rigid by the completion of its travel. The calibrating units passed during said travel ensure that the section leaves the cooling chamber with the minimum dimensional tolerances.

The calibrating device shown in the drawings has two parallel guide rails 1, 2 retained by crossheads 3, 4 disposed at the ends. Mounted spaced out in the drawing-off direction on the guide rails 1, 2 are three calibrating units 5, 6, 7. The calibrating units 5 to 7 are identically constructed, so that the following description can be limited to the calibrating unit 5 illustrated more particularly.

The individual calibrating units 5 to 7 can be equipped with separate vacuum and tempering connections.

The calibrating unit 5 has an opening 8 through which the section to be extruded can pass. On the underside it has two gate-arch-like recesses 9, 10 in which the guide rails 1, 2 are disposed. The guide rails 1, 2 are retained in the recesses 9, 10 by means of pivotable claws 11, 12 borne by the calibrating unit 5. The guide rails 1, 2 are at a distance from the recesses 9, 10 and the claws 11, 12 on all sides, so that the calibrating unit 5 can move in all directions of the plane normal in relation to the drawing-off direction. The calibrating unit 5 is therefore mounted floatably on the guide rails 1, 2. The position of the calibrating unit 5 in the drawing-off direction is determined by a stop 13 which can be clamped steplessly on the rails 2.

In the calibrating device the individual calibrating units 5 to 7 are simply placed on the guide rails 1 and secured against lifting-off by the claws 11, 12. Due to the clearance on all sides at the guide rails 1, 2, the individual calibrating units 5 to 7 can be laterally adjusted on the section passing through, so that the section experiences no lateral displacing force at the individual calibrating units 5 to 7. The stressing of the section at the individual calibrating units 5 to 7 is therefore reduced in comparison with the stressing in a known calibrating device.

I claim:

1. A device for calibrating extruded plastic sections, comprising
   a continuous cooling chamber wherein said plastic sections are extruded along a drawing-off direction,
   a guide disposed within said cooling chamber along said drawing-off direction,
   a plurality of calibrating units disposed successively along said guide, and means for floatably mounting said plurality of calibrating units on said guide so that said calibrating units can move freely in a plane normal to said drawing-off direction and thereby relieve stresses occurring at each calibrating unit as said plastic sections are extruded.

2. The device of claim 1 wherein said floatable mounting means permit said calibrating units to be moved along said guide in the drawing-off direction.

3. The device of claim 2 further comprising adjustable stops mounted on said guide for limiting movement of said calibrating units along said guide in the drawing-off direction.

4. The device of claim 1, 2, or 3 wherein said guide comprises rails on which said calibrating units are floatably mounted with lateral and vertical clearance from said rails.

5. The device of claim 3 wherein said floatable mounting means comprises pivotable claws attached to said calibrating units.

* * * * *